United States Patent Office 2,945,038
Patented July 12, 1960

2,945,038

5-FLUOROCYTOSINE AND PREPARATION THEREOF

Robert Duschinsky, Essex Fells, N.J., and Charles Heidelberger, Madison, Wis.; said Duschinsky assignor to Hoffmann-La Roche Inc., Nutley, N.J., a corporation of New Jersey No Drawing. Original application Sept. 26, 1956, Ser. No. 612,088, now Patent No. 2,802,005, dated Aug. 6, 1957. Divided and this application May 27, 1957, Ser. No. 661,602

3 Claims. (Cl. 260—256.4)

This invention relates to novel chemical compounds and to novel processes and novel intermediates useful in preparing the same. More particularly, the invention relates to 5-fluorocytosine and acid addition salts thereof; to methods of preparing said 5-fluorocytosine and acid addition salts; and to intermediates useful in practicing said methods.

This application is a division of our copending application Serial No. 612,088, filed September 26, 1956, which issued as Patent No. 2,802,005 on August 6, 1957.

A quick survey of the invention is afforded by the following flow sheets. The symbols employed in the flow sheets have the following meanings:

$R^0A$ represents a lower alkylating agent; preferably a lower alkyl ester of an inorganic mineral acid, such as diethyl sulfate, methyl bromide, ethyl iodide, and the like: in the preferred case, $R^0$ represents a lower alkyl radical and A represents an anionic portion of said mineral acid.

$M^0$ and M each represents an alkali metal, for example potassium or sodium.

$R^1$ and $R^2$ each represents a lower alkyl radical.

R represents a radical selected from the group consisting of lower alkyl and benzyl.

X represents a halo substituent selected from the group consisting of chloro and bromo.

It will be understood that none of the lower alkyl radicals represented by the symbols $R^0$, $R^1$, $R^2$ and R need be identical; but any or all of such radicals can be identical alkyl radicals. Likewise, the alkali metals represented by the symbols $M^0$ and M need not be identical; but such metals can be identical.

FLOW SHEET—PROCESS I

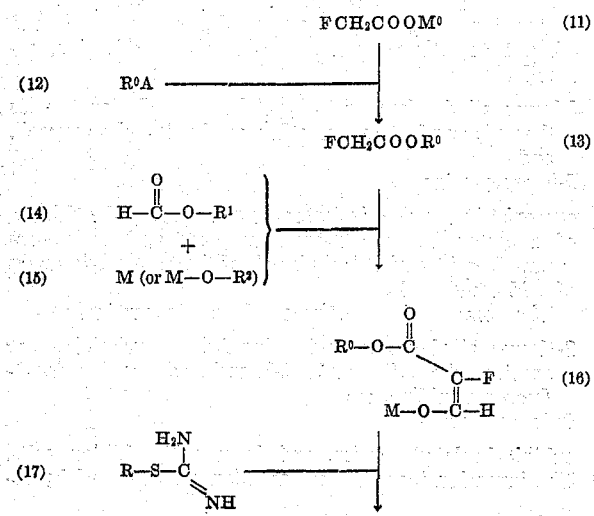

FLOW SHEET—PROCESS II

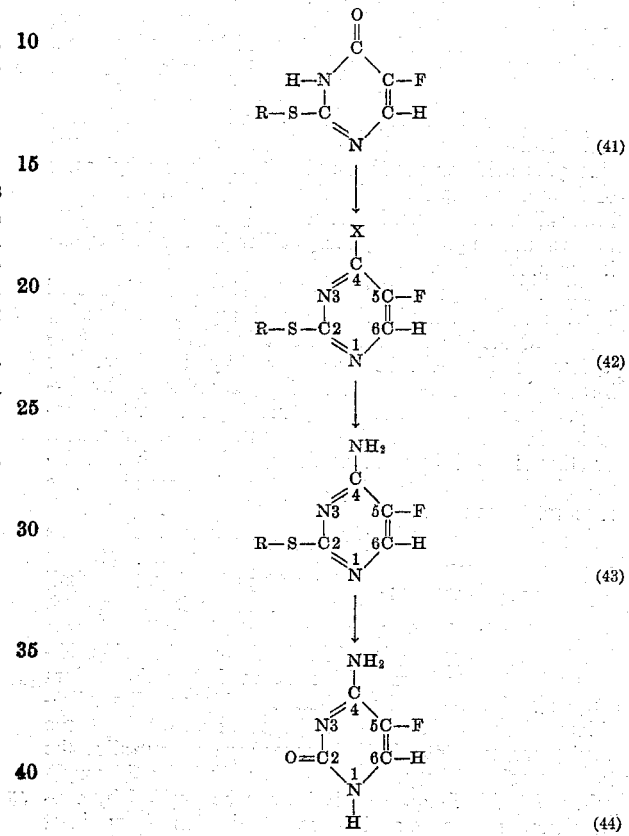

Process I

As will be appreciated from the foregoing flow sheet for Process I, a comprehensive embodiment of this aspect of the invention provides a process which comprises reacting alkali metal fluoroacetate 11 with lower alkylating agent 12, thereby producing lower alkyl fluoroacetate 13; subjecting the latter to Claisen condensation with lower alkyl formate 14 in the presence of alkali metal-containing condensing agent 15, thereby producing alkali metal enolate of lower alkyl fluoromalonaldehydate 16; and condensing the latter under anhydrous conditions with a member 17 selected from the group consisting of S-(lower alkyl)isothiourea and S-benzylisothiourea, thereby producing the corresponding member 18 of the group consisting of S-lower alkyl ether of 2-thio-5-fluorouracil and S-benzyl ether of 2-thio-5-fluorouracil.

The first stage of the comprehensive embodiment of Process I referred to above comprises reacting the alkali metal fluoroacetate 11 with a lower alkylating agent 12. Preferably the sodium or potassium salt of fluoroacetic acid is used as reactant 11; and preferably diethyl sulfate or dimethyl sulfate or methyl bromide or ethyl chloride or the like is used as the lower alkylating agent 12. The reaction can be effected, for example, by heating the reactants together until completion of the reaction whereby the lower alkyl radical is exchanged for the alkali metal. An inert solvent can be employed, if desired, but its use is not required. The product can be purified, if desired, by conventional means, for example, by distillation.

The second stage of said comprehensive embodiment comprises reacting the lower alkyl fluoroacetate 13 in a Claisen condensation with lower alkyl formate 14, employing an alkali metal-containing condensing agent 15, such as an alkali metal itself, e.g. potassium or sodium, or an alkali metal lower alkoxide, e.g. potassium ethoxide or sodium methoxide. Preferably a potassium lower alkoxide, such as potassium ethoxide, is employed as condensing agent; the potassium enolate thereby produced as product can be easily isolated in well crystallized form. A suitable method of effecting this second stage of the overall process comprises heating the reactants 13, 14 and 15 together, in an anhydrous inert solvent, such as diethyl ether or toluene, until completion of the condensation. The product, represented by general formula 16 in the flow sheet, can be styled alkali metal enolate of lower alkyl fluoromalonaldehydate; alternative nomenclatures are, alkali metal salt of lower alkyl ester of fluoromalonaldehydic acid, or alkali metal salt of lower alkyl ester of formylfluoroacetic acid. Particularly when potassium lower alkoxides are used as condensing agents, the product 16 need not be purified by recrystallization for further use in the process.

The third stage of the comprehensive embodiment of Process I shown in the flow sheet comprises condensing the alkali metal enolate of lower alkyl fluoromalonaldehydate 16 with 17, i.e. S-(lower alkyl)isothiourea or S-benzylisothiourea, under anhydrous conditions. Preferably, the reaction is effected by heating the reactants together in an anhydrous inert solvent, such as methanol or ethanol, until the condensation reaction has been completed. It is recommended to use the alkali metal enolate reactant 16 as soon as possible after it has been prepared. It is preferred to use freshly prepared alkali metal enolate reactant 16, i.e. material which is not older than two (or at most three) days old; and preferably the alkali metal enolate should be used as soon as it is prepared. The S-(lower alkyl) isothiourea or S-benzylisothiourea is advantageously employed in the form of its acid addition salt with a mineral acid, e.g. S-methylisothiouronium sulfate or S-ethylisothiouronium bromide or S-benzylisothiouronium chloride, in the presence of at least the equivalent amount of alkali necessary to neutralize the mineral acid. The product, S-lower alkyl (or S-benzyl) ether of 2-thio-5-fluorouracil 18, can be purified by conventional means, e.g. by recrystallization from inert solvents.

One preferred embodiment of the overall Process I shown in the flow sheet comprises reacting sodium fluoroacetate with diethyl sulfate, thereby producing ethyl fluoroacetate; reacting the latter in a Claisen condensation with ethyl formate in the presence of potassium ethoxide, thereby producing potassium enolate of ethyl fluoromalonaldehydate, and condensing freshly prepared potassium enolate of ethyl fluoromalonaldehydate under anhydrous conditions with S-methylisothiourea, thereby producing S-methyl ether of 2-thio-5-fluorouracil. Still another preferred embodiment of the overall Process I comprises the same operations in the same sequence; except that S-ethylisothiourea is employed in lieu of S-methylisothiourea in the last step, S-ethyl ether of 2-thio-5-fluorouracil being thereby produced in lieu of S-methyl ether of 2-thio-5-fluorouracil.

In the following description of the process represented diagrammatically above in the "Flow Sheet—Process II," the reference numeral 41 is employed in lieu of the numeral 18 previously used in Process I to designate the intermediate S-lower alkyl (or S-benzyl) ether of 2-thio-5-fluorouracil.

Process II

As will be appreciated from the foregoing flow sheet for Process II, a comprehensive embodiment of this aspect of the invention provides a process which comprises reacting a member 41 of the group consisting of S-lower alkyl ether of 2-thio-5-fluorouracil and S-benzyl ether of 2-thio-5-fluorouracil with a phosphorus pentahalide selected from the group consisting of phosphorus pentachloride and phosphorus pentabromide, thereby producing the corresponding member 42 selected from the group consisting of 2-(lower alkyl)mercapto-4-chloro-5-fluoropyrimidine, 2-(lower alkyl)mercapto-4-bromo-5-fluoropyrimidine, 2-benzylmercapto-4-chloro-5-fluoropyrimidine and 2 - benzylmercapto - 4 - bromo-5-fluoropyrimidine; aminating said corresponding member, thereby producing the corresponding member 43 of the group consisting of 2-(lower alkyl)mercapto-4-amino-5-fluoropyrimidine and 2-benzylmercapto-4-amino-5-fluoropyrimidine; and hydrolyzing said latter corresponding member, thereby producing 5-fluorocytosine 44.

The first stage of the comprehensive embodiment of Process II referred to above comprises reacting S-lower alkyl (or S-benzyl) ether of 2-thio-5-fluorouracil with phosphorus pentachloride or phosphorus pentabromide. Preferably, the S-ethyl or S-methyl ether of 2-thio-5-fluorouracil is reacted with phosphorus pentachloride. The reaction can be effected conveniently by merely heating a mixture of the reactants, and then driving off the phosphorus oxychloride byproduct by heating in vacuo. The 2-(lower alkyl)mercapto- (or 2-benzylmercapto-) 4-halo-5-fluoropyrimidine 42 obtained as the product of this stage can be purified by extracting with an inert solvent, such as diethyl ether.

The second stage of the comprehensive embodiment of Process II referred to above comprises exchanging the 4-halo substituent in the intermediate product 42 for an amino group. This reaction can be effected conveniently by reacting the product 42 with liquid ammonia under heat and pressure. Alternatively, alcoholic ammonia can be employed. The resulting 2-(lower alkyl)mercapto- (or 2-benzylmercapto-) 4-amino-5-fluoropyrimidine 43 can be purified by recrystallization from an inert solvent.

The third stage of the comprehensive embodiment of Process II referred to above comprises hydrolyzing the intermediate product 43. The hydrolysis can be conveniently effected by conventional means, for example by heating the reactant 43 with an aqueous solution of a mineral acid, e.g. with concentrated aqueous hydrobromic acid. The resulting product, 5-fluorocytosine 44, can be purified, for example, by recrystallization from water.

One preferred embodiment of the overall Process II shown in the flow sheet comprises reacting S-ethyl ether of 2-thio-5-fluorouracil with phosphorus pentachloride, thereby producing S - ethylmercapto-4-chloro-5-fluoropyrimidine; reacting the latter with liquid ammonia under heat and pressure, thereby producing S-ethylmercapto-4-amino-5-fluoropyrimidine; and refluxing the latter with concentrated aqueous hydrobromic acid, thereby producing 5-fluorocytosine.

It will be appreciated that the compounds represented in the foregoing flow sheets by the formulas 18 and 44, and sometimes referred to in this specification, respectively, as S-lower alkyl ether of 2-thio-5-fluorouracil (or species thereof), and S-benzyl ether of 2-thio-5-fluorouracil, and 5-fluorocytosine can exist in tautomeric forms, resulting from the shifting of a proton between a nitrogen atom and an oxygen atom. The invention includes all of the tautomeric forms of said compounds.

The compounds sometimes referred to herein as 2-(lower alkyl)mercapto-4-amino-5-fluoropyrimidine (or species thereof) and 2-benzylmercapto-4-amino-5-fluoropyrimidine, and 5-fluorocytosine exhibit basic properties, and form acid addition salts. The invention includes acid addition salts formed by reacting said compounds with medicinally acceptable acids, e.g. mineral acids, such as hydrochloric acid, hydrobromic acid, sulfuric acid, nitric acid, phosphoric acid; non-toxic organic acids, such as ethane sulfonic acid, toluenesulfonic acid, tartaric acid, citric acid; and the like.

5-fluorocytosine and its salts are useful as antimetabolites, being active, for example, to inhibit the growth of *L. leichmannii, L. casei, S. faecalis,* and the like.

The invention is further disclosed in the following examples, which are illustrative but not limitative thereof. Temperatures are stated in degrees centigrade, corrected.

EXAMPLE 1

A mixture of 200 g. (2 mols) of dry sodium fluoroacetate and 442 g. (2.86 mols) of diethyl sulfate was refluxed for three and one-half hours in an oil bath. The reaction mixture was then distilled through a fractionating column, yielding 177.3 g. of crude ethyl fluoroacetate, having a boiling range of 116°–120°. The material was redistilled through a fractionating column, yielding purified ethyl fluoroacetate boiling at 114°–118°.

EXAMPLE 2

In a 2-liter, 3-neck, round bottom flask, provided with stirrer, dropping funnel and reflux condenser, was placed 880 ml. of absolute diethyl ether, and 47.6 g. (1.22 mols) of potassium, cut into 5 mm. pieces, was suspended therein. 220 ml. of absolute ethanol was added dropwise, while stirring, whereby the heat of reaction produced refluxing. In order to obtain complete dissolution of the potassium, the mixture was finally refluxed on a steam bath. The reaction mixture was then cooled in an ice bath, and a mixture of 135 g. (1.22 mols) of ethyl fluoroacetate and 96.4 g. (1.3 mols) of freshly distilled ethyl formate was added dropwise, while stirring and cooling, over a period of two and one-half hours. Upon completion of the addition of the ethyl formate, the reaction mixture was stirred for an additional hour while cooling, and then was allowed to stand overnight at room temperature. At the end of this time the crystalline precipitate which had formed was filtered off with suction, washed with diethyl ether, and dried in a vacuum desiccator. The product comprised essentially the potassium enolate of ethyl fluoromalonaldehydate (alternative nomenclature, the potassium salt of fluoromalonaldehydic acid ethyl ester).

EXAMPLE 3

A mixture of 103.6 g. (0.6 mol) of the freshly prepared potassium enolate of ethyl fluoromalonaldehydate, 83.4 g. (0.3 mol) of S-methylisothiouronium sulfate and 32.5 g. (0.6 mol) of sodium methoxide was refluxed with stirring in 1500 ml. of absolute methanol. At first the reactants dissolved to a great extent, but very shortly thereafter precipitation occurred. The reaction mixture was refluxed for two hours and at the end of this time was evaporated to dryness in vacuo. The residue was treated with 280 ml. of water; incomplete dissolution was observed. The mixture obtained was clarified by filtering it through charcoal. The filtrate was acidified (to a slight Congo acid reaction) by adding concentrated aqueous hydrochloric acid, containing 37% by weight HCl (48 ml. required). The material which crystallized from the acidified solution was filtered off, washed free of sulfates with water and dried at 100°, yielding crude S-methyl ether of 2-thio-5-fluorouracil, having a melting range from 202° to 221°. The latter material was recrystallized by dissolving it in 2035 ml. of boiling ethyl acetate and cooling to minus 20°, yielding S-methyl ether of 2-thio-5-fluorouracil, M.P. 230°–237°, in a sufficient state of purity that it could be used directly for the next step. A sample of the material was recrystallized from water (alternatively, from ethyl acetate) thereby raising the melting point to 241°–243°. For analysis the material was further purified by subliming it in vacuo at 140°–150°/0.1 mm.

The S-methyl ether of 2-thio-5-fluorouracil so obtained was an acidic material, which formed salts upon reaction with bases. For example, it dissolved, with salt formation, in dilute aqueous sodium hydroxide solution, in aqueous ammonia, and in an aqueous solution of ethanolamine.

EXAMPLE 4

A mixture of 17.3 g. (0.1 mol) of the freshly prepared potassium enolate of ethyl fluoromalonaldehydate, 18.5 g. (0.1 mol) of S-ethylisothiouronium bromide and a solution of 2.3 g. (0.1 mol) of sodium in 250 ml. of absolute ethanol was refluxed for two hours while stirring. The reaction mixture, consisting of a slightly yellowish crystalline material suspended in the liquid, was evaporated to dryness in vacuo. The residue was dissolved in 80 ml. of warm water and the solution was clarified by filtering through charcoal. The filtrate was cooled in an ice bath and acidified (to a slight Congo acid reaction) by adding concentrated aqueous hydrochloric acid (5.8 ml. required). The material which crystallized from the acidified solution was filtered off, washed free of bromides with ice cold water and dried at 100°, yielding crude S-ethyl ether of 2-thio-5-fluorouracil, having a melting range from 164° to 175°. The latter material was suspended in a 1:4 (by volume) mixture of toluene and ligroin (boiling point 90°–120°) and refluxed for a few minutes. Partial solution was obtained. The insoluble material was filtered from the boiling mixture and suspended in toluene. The suspension was brought to boiling and filtered hot. Upon cooling in an ice bath, the filtrate deposited crystals which were filtered off and dried at 100°. There was thus obtained purified S-ethyl ether of 2-thio-5-fluorouracil melting from 181° to 185° (alternative nomenclatures: 2-ethylmercapto-4-hydroxy-5-fluoropyrimidine, or 2-ethylmercapto-5-fluoro-4(3H)-pyrimidinone). The material was again recrystallized from ethyl acetate, yielding further purified compound melting at 190°–191°. This material was sufficiently pure to be used for the next step. For analysis a sample of 300 mg. was again recrystallized from 10 ml. of ethyl acetate to yield 210 mg. of pure compound melting at 192°–193°.

The S-ethyl ether of 2-thio-5-fluorouracil thus obtained was an acidic material, which formed salts upon reaction with bases. For example, it dissolved, with salt formation, in dilute aqueous sodium hydroxide solution and in aqueous ammonia.

EXAMPLE 5

A solution of 43 g. (0.25 mol) of freshly prepared ethyl potassio-fluoromalonaldehydate, 50.6 g. (0.25 mol) of S-benzylisothiouronium chloride and 13.5 g. (0.25 mol) of sodium methoxide in 640 ml. of methanol was refluxed for two hours while stirring. The reaction mixture was evaporated to dryness in vacuo, and the residue was taken up in 220 ml. of water. The resulting turbid solution was made alkaline to phenolphthalein by addition of 12 ml. of 2 N aqueous sodium hydroxide solution and was then extracted with three portions of diethyl ether, each portion consisting of 60 ml. The aqueous layer was then acidified with 16 ml. of concentrated aqueous hydrochloric acid and cooled with ice. The precipitated crystals were filtered and washed chlorine-free with water and then with diethyl ether. There was thus obtained crude S-benzyl ether of 2-thio-5-fluorouracil (alternative nomenclature: 2-benzylmercapto-5-fluoro-4(3H)-pyrimidinone), having melting point 180°–189°. Upon recrystallization from ethanol, the melting point was raised to 205°–206°. A second recrystallization from ethanol raised the melting point to 216°–218°.

EXAMPLE 6

A mixture of 10 g. of S-ethyl ether of 2-thio-5-fluorouracil and 12 g. of phosphorus pentachloride was heated on a steam bath until the mixture was liquefied to a clear solution. The phosphorous oxychloride formed was removed by heating in vacuo on a steam bath. To the oily residue was added crushed ice, whereupon crystallization was observed. The reaction mixture was extracted with three portions of diethyl ether, each consisting of 25 ml.; and the ethereal solution was dried over sodium sulfate. The dried solution upon evaporation yielded an oil comprising essentially 2-ethylmercapto-4-chloro-5-fluoropyrimidine, which crystallized only below room temperature.

EXAMPLE 7

The oil obtained in Example 6 above was autoclaved for 12 hours with 120 ml. of liquid ammonia, in a boiling water bath. The ammonia was then evaporated, and the semi-solid reaction product was taken up with 100 ml. of water and 10 ml. of ethanol. The crystals which separated were filtered and washed chlorine-free with water, leaving a residue of 2-ethylmercapto-4-amino-5-fluoropyrimidine, M.P. 94°–95°. A sample was recrystallized from 30 volumes of ligroin (B.P. 90°–120°): the recrystallized product melted at 94°–95°.

The 2-ethylmercapto-4-amino-5-fluoropyrimidine, obtained as described above, was a basic material, which formed acid addition salts upon reaction with acids. Thus, it dissolved in dilute aqueous hydrochloric acid, thereby forming the hydrochloride salt.

EXAMPLE 8

8.53 g. of crude 2-ethylmercapto-4-amino-5-fluoropyrimidine, M.P. 90°–91°, was refluxed for four hours with 85 ml. of concentrated aqueous hydrobromic acid (containing 48% by weight HBr) in a nitrogen atmosphere. The solution was evaporated in vacuo, and the residue was twice taken up with water and re-evaporated. The final residue was dissolved in 25 ml. of hot water and the solution was clarified by filtration through charcoal. Upon addition of 11 ml. of concentrated ammonia, the base precipitated. After cooling in ice, it was filtered and washed with cold water and ethanol, yielding 5-fluorocytosine (alternative nomenclature: 2-hydroxy-4-amino-5-fluoropyrimidine). The product melted with decomposition at approximately 297°.

5-fluorocytosine is a basic material, and forms acid addition salts upon reaction with acids. Thus, it dissolved in dilute aqueous hydrochloric acid and dilute aqueous hydrobromic acid, with formation of 5-fluorocytosine hydrochloride and 5-fluorocytosine hydrobromide, respectively.

EXAMPLE 9

To a solution of 0.26 g. (0.002 mol) of 5-fluorocytosine in 5 ml. of water and 5 ml. of acetic acid there was added a solution of 0.69 g. (0.01 mol) of sodium nitrite in 10 ml. of water in three portions over a period of one hour. The mixture was allowed to stand overnight, and then was evaporated on a steam bath. The semi-solid residue obtained was dissolved in 10 ml. of water, the solution was rendered alkaline by addition of 3 ml. of 3 N sodium hydroxide and then was passed through a 1.8 cm. x 20 cm. column of "Dowex 1–X4" (Dow Chemical Co., Midland, Michigan: an anion exchange resin consisting of a cross-linked copolymer of styrene with divinyl benzene [4% of the latter], containing quaternary ammonium groups as the functional groups), 100–200 mesh size, previously saturated with formate ion by washing with 0.1 N aqueous formic acid. After washing the column with 250 ml. of water, elution was performed with 0.1 N aqueous formic acid, 50 ml. fractions being taken and examined for ultraviolet absorption at 265 m$\mu$. Only fraction No. 5 contained substantial amounts of absorbing material. This fraction upon evaporation to dryness yielded 5-fluorouracil, which was identified by mixed melting point and comparison of the ultraviolet spectrum at pH=1 and 7.2 with an authentic specimen.

EXAMPLE 10

In a 3 liter flask provided with stirrer, reflux condenser, dropping funnel, thermometer and gas inlet tube by which a continuous stream of nitrogen was provided during all operations, was placed 880 ml. of toluene and then 47.6 g. (1.214 mol) of potassium. The flask was heated in an oil bath to ca. 80° until the potassium melted. The metal was finely divided by stirring. Then 190 ml. of ethanol was dropped in at such a rate (ca. 30 minutes required) that slight refluxing resulted. Heating was continued until all potassium was dissolved (additional 45 minutes required). Then ca. 250 ml. of toluene-ethanol mixture was distilled off. Upon cooling in an ice bath, some crystallization of potassium ethoxide was observed. 146 g. (2.428 mol, 149 ml.) of dry methyl formate (distilled over $CaCO_3$) was added, whereupon a clear colorless solution resulted. With continuous cooling in an ice bath and stirring, 135 g. (1.214 mol) of ethyl fluoroacetate was added dropwise within two hours. After one hour of further stirring, the ice bath was removed and the crystallizing mixture was allowed to stand at room temperature overnight. The almost colorless crystals were filtered, washed with ether and dried in vacuo at room temperature, yielding potassium enolate of ethyl fluoromalonaldehydate (alternative nomenclature potassio ethyl formylfluoroacetate).

EXAMPLE 11

To a solution of 6.7 g. (0.29 mol) of sodium in 720 ml. of absolute ethanol, prepared in a 2-liter, 3-neck flask provided with stirrer and reflux condenser, was added 50 g. (0.29 mol) of the above potassium enolate (from Example 10) and 53.6 g. (0.29 mol) of ethyl isothiouronium bromide. An almost complete solution resulted which soon became cloudy by crystallization. The mixture was refluxed with continuous stirring on a water bath for two hours. The alcohol was distilled off in vacuo; the residue obtained was dissolved in 140 ml. of water, the solution was clarified by filtering through charcoal, cooled in an ice bath and acidified (to Congo paper) by addition of 22 ml. of concentrated hydrochloric acid. The crystalline precipitate was filtered, washed chlorine-free with water and dried at 100°, the yielding 2-ethylmercapto-5-fluoro-4(3H)-pyrimidinone, M.P. 175°–179°. The crude material was dissolved in 710 ml. of boiling ethyl acetate, the hot solution was filtered and cooled to −10°. The crystals were filtered and washed with cold ethyl acetate. The melting point was thus raised to 189°–190°.

We claim:
1. A compound selected from the group consisting of 5-fluorocytosine and acid addition salts thereof.
2. 5-fluorocytosine.
3. A process which comprises reacting with liquid ammonia under heat and pressure a member selected from the group consisting of 2-(lower alkyl)mercapto-4-chloro-5-fluoropyrimidine, 2-(lower alkyl)mercapto-4-bromo-5-fluoropyrimidine, 2-benzylmercapto-4-chloro-5-fluoropyrimidine and 2-benzylmercapto-4-bromo-5-fluoropyrimidine, thereby producing the corresponding member of the group consisting of 2-(lower alkyl)mercapto-4-amino-5-fluoropyrimidine and 2-benzylmercapto-4-amino-5-fluoropyrimidine.

References Cited in the file of this patent
UNITED STATES PATENTS

| | | |
|---|---|---|
| 2,433,440 | Curd | Dec. 30, 1947 |
| 2,666,764 | Lanzillotti et al. | Jan. 19, 1954 |
| 2,802,005 | Heidelberg et al. | Aug. 6, 1957 |

OTHER REFERENCES

Baker et al.: Jour. of Organic Chemistry, vol. 19, pp. 631–637 (1954).

Johnson et al.: Am. Chem. J., vol. 42, pp. 271–287 (1909).

Dorow et al.: Annalen der Chemie, vol. 588, pp. 45–61 (1954).

Hilbert et al.: Jour. Amer. Chem. Soc., vol. 56, pp. 134–139 (1934).